United States Patent [19]
Kaufman

[11] Patent Number: 5,292,600
[45] Date of Patent: Mar. 8, 1994

[54] HYDROGEN POWER CELL

[75] Inventor: Arthur Kaufman, West Orange, N.J. 07052

[73] Assignee: H-Power Corp., Belleville, N.J.

[21] Appl. No.: 929,627

[22] Filed: Aug. 13, 1992

[51] Int. Cl.[5] .............................................. H01M 2/14
[52] U.S. Cl. ...................................... 429/39; 429/40; 429/34
[58] Field of Search ............................ 429/34, 38–39, 429/40

[56] References Cited
U.S. PATENT DOCUMENTS 3,905,832  9/1975  Trocciola .................... 429/39
4,175,165 11/1979  Adlhart ....................... 429/30
4,757,421  4/1988  Uemura et al. ............... 429/34

Primary Examiner—Kathryn Gorgos
Attorney, Agent, or Firm—Anthony H. Handal

[57] ABSTRACT

A hydrogen fuel cell comprising a cathode and an anode is disclosed. An electrolyte is disposed therebetween. The cathode is supplied with oxygen via a porous carbonaceous distribution plate. The anode is supplied with hydrogen. The operation of the fuel cell results in the generation of water. The carbonaceous member is oxidized sufficiently to impart hydrophilicity to the carbonaceous member while retaining mechanical strength and electrical properties.

11 Claims, 2 Drawing Sheets

HYDROGEN POWER CELL

TECHNICAL FIELD

The present invention relates to hydrogen power cells of the type which receive hydrogen fuel and produce electricity.

BACKGROUND

Ever since the political vulnerability of this nation's largely foreign controlled petroleum sources became painfully obvious in the early 1970's, there has been an intensive effort devoted to the development of alternative energy sources and conservation of existing resources. In more recent years, the acute nature of the energy problem has been underscored by a growing public awareness of the related environmental questions.

To a large extent, efforts aimed at energy conservation and alternative energy generation have met with a large degree of success in such areas as the heating and cooling of structures, automobile efficiency and the like. More particularly, large advances have been made by designing hotter running gasoline engines, use of reflective glazing, impermeable construction barriers, solar heating and the like.

However, one technology which has largely failed to live up to its very promising expectations is the use of hydrogen for the generation of electricity. Generally, this technology involves the utilization of hydrogen in electrochemical combustion for the purpose of generating electricity. A device in which such a process is carried out is generally referred to as a fuel cell. Because the electricity is generated by the combustion of hydrogen with oxygen, the only combustion product involved is water vapor which is completely harmless to the environment. This may be compared to gasoline combustion which involves the release of hydrocarbons, carbon monoxide, and complex chemical species into the environment (along with the primary emissions, carbon dioxide and water vapor).

While it has been known that fuel cells offer many advantages as compared to other power sources, particularly in supplying power at remote locations (such as outer space or the like) and offer at least, in principle, limited service and maintenance requirements, various problems are presented by existing fuel cell technology. Nevertheless, perhaps the most advantageous fuel cell systems presently available (for certain applications, at least) are those which utilize a so-called ion-exchange membrane (IEM) electrolyte. Generally, in systems such as this, the electrolyte is embodied in the form of a synthetic polymeric material which acts as an electrolyte while still having the characteristic of being a solid body.

This type of system offers numerous advantages. For example, since the electrolyte phase is solid, no operational complications arise from migration of electrolytic material into adjacent regions of the fuel cell. At the same time, the system is mechanically stable and hardy under a wide variety of operating conditions. Moreover, such fuel cells have the ability to operate at or near room temperature and thus provide virtually instantaneous start-up. In principle, such systems offer the possibility that thermal management may be passively achieved, although practical implementation of this in a wide variety of designs may pose difficult design problems.

Notwithstanding the general advantageous of such IEM fuel cell systems, difficulty arises in that product water tends to accumulate as a liquid adjacent the cathode where it hampers proper cell operation. More particularly, the problem involves the fact that the electrode generally comprises compacted graphite fibers which have been rendered relatively hydrophobic. As water molecules are formed at the cathode, these molecules tend to migrate away from the interface between the cathode and the IEM. This leads to their migrating across the cathode, and they tend to accumulate on the side of the cathode opposite from the IEM. Insofar as the first spaces encountered on the other side of the cathode are the air conduits for feeding oxygen to the cathode, and since these fuel cells typically operate at or near room temperature, these conduits tend to become filled with water, thus impeding fuel cell operation. The result is that the channels can lose a large measure of their functionality and the flow of oxygen which should be supplied to the cathode's catalytic reaction sites can be greatly impaired. The result tends to be a serious degradation in fuel cell performance.

One possible approach to solving this problem is the use of a pump to continually flush the oxygen-conducting channels or conduits. If one were to consider the use of a pump (or blower) which blows air at a relatively high rate of speed through the channels, such a device would consume significant amounts of electricity, might provide only limited relief to the problem, and is likely to cause IEM inefficiencies by lowering the internal water content of the IEM.

In an effort to alleviate this problem, it has been proposed that treatment of the channel-defining plates adjacent the cathode with a material that renders them hydrophilic would readily result in wicking away of water before accumulations become serious. Such treatment is accomplished by coating the surfaces of the channels with colloidal silica. In principle, it was intended that the product water be caused to migrate across the channel-defining plate surface to the edges of the plates, where the water could be collected.

While this sort of approach did help the problem of product water accumulation in passive IEM fuel cells, difficulties still remain. For example, the applied colloidal silica, while it did provide a hydrophilic layer, was found to erode over time, resulting in premature failure of the fuel cell due to progressive loss in hydrophilicity. Failure can be accelerated due to the fact that such deterioration of the colloidal silica layer could cause a build-up of silica in the channels, thereby impeding operation of the system by interfering with access of air to the catalytic sites of the cathode.

SUMMARY OF THE INVENTION

The invention, as claimed, is intended to provide a remedy. It solves the problem of providing a hydrogen fuel cell utilizing a solid ion-exchange membrane electrolyte which may be operated efficiently and without degradation by eliminating the problems of the accumulation of product water in the channels while, at the same time, removing the problem of hydrophilic layer shedding from the surfaces of the channel member.

More particularly, in accordance with the present invention, a porous gas-distribution element is provided, at least in the region adjacent the cathode, which has been treated with an oxidizing agent to render it hydrophilic throughout its entire surface area. The same is achieved without the introduction of metal or metal oxides. Instead, water is absorbed into the hydrophilic structure of the gas-distribution element, thereby leaving the air channels unobstructed. Consequently, because the water is absorbed not only at the external surface but into the internal surfaces of the gas-distribution element, the facing surfaces of the cathode and the gas-distribution element have relatively small amounts of water on their surfaces and the air stream in the system is effective in providing efficient evaporation of product water.

In accordance with the further embodiment of the invention, a wick or other means may be provided at the periphery of the gas-distribution element to aid in the removal of liquid from the cell.

BRIEF DESCRIPTION OF THE DRAWINGS

One way of carrying out the invention is described in detail below with reference to drawings which illustrate only two specific embodiments of the invention and in which.

BEST MODE FOR CARRYING OUT THE INVENTION

Figure 1:
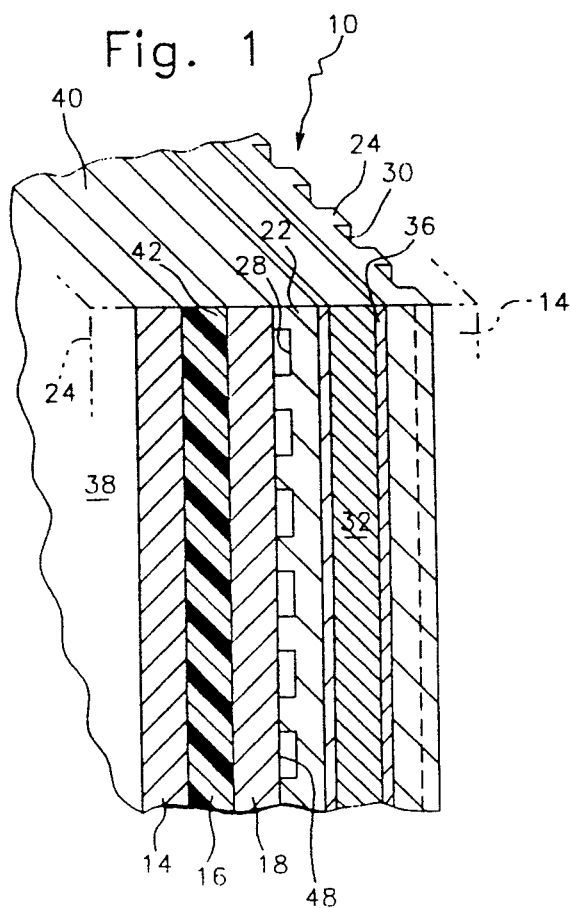
FIG. 1 is a schematic view of a fuel cell, partially in cross-section, constructed in accordance with the present invention.
Figure 2:
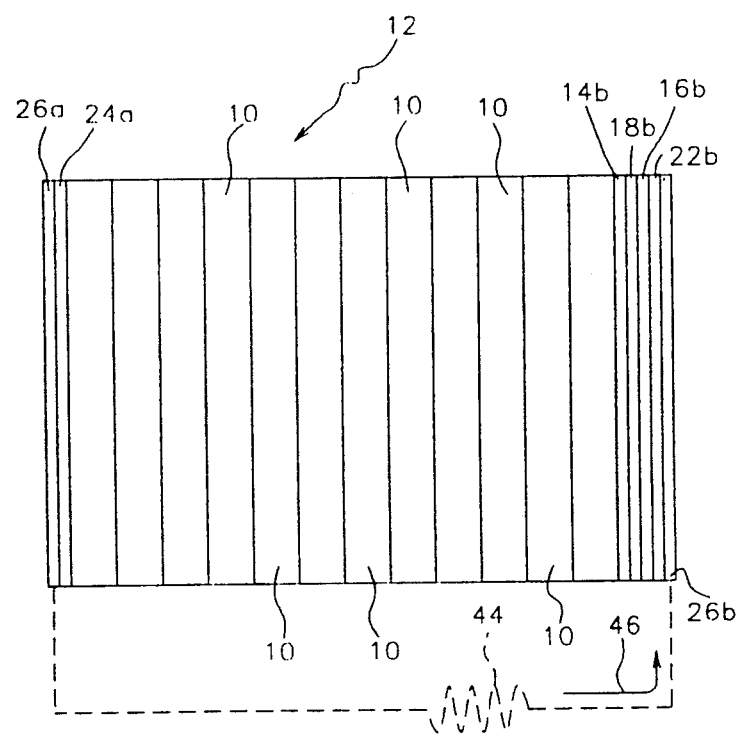
FIG. 2 is a schematic diagram of a power source using a plurality of fuel cells.

Referring to FIG. 1, a hydrogen powered electricity generating cell 10 incorporating the present invention, as appears more fully below, is illustrated. Cell 10 includes a plurality of layers of planar members each having relatively small thickness and an active area of approximately 40 square centimeters. A single cell 10 has the capacity of generating approximately two amperes at approximately 0.7 volts. An actual power source 12, as illustrated in FIG. 2, comprises a plurality of cells 10 which are disposed in surface-to-surface contact with each other and will generate a voltage equal to the voltage of an individual cell multiplied by the number of cells in the power source 12.

Referring back to FIG. 1, each cell 10 comprises an anode 14, which incorporates a so-called "carbon paper" substrate. Such carbon paper is a paper-like product made of compacted graphite fibers which is available from numerous sources including the Toray Company of Tokyo, Japan. Anode 14 has a thickness of 0.01 to 0.05 cm.

Electrolyte member 16 is disposed in contact with anode 14. Electrolyte member 16 is made of a solid polymeric material which is especially designed for use as an electrolyte and is of the type sold by the du Pont Company of Wilmington, Del. under the trademark NAFION which is a copolymeric perfluorocarbon containing cation exchange groups. Electrolyte member 16 has a thickness of 0.002 to 0.020 cm. In order to function efficiently as an electrolyte, electrolyte member 16 must have a high water content.

The next layer in cell 10 is the cathode, another layer incorporating a so-called carbon paper substrate. Cathode 18 also has a thickness of 0.01 to 0.05 cm.

The next layer in cell 10 is an oxygen distribution plate 22, which has a plurality of grooves 28 in its surface facing the cathode 18. The oxygen distribution plate 22 has a thickness of 0.075–0.30 cm. Grooves 28 are cut to a depth of about 0.025 to 0.200 cm. The next layer in cell 10 is a bipolar separator plate 26, which performs the functions of electronically connecting the cells together and isolating the oxygen in the oxygen distribution plate 22 from hydrogen in the opposite adjacent plate 24, which is a hydrogen distribution plate.

The bipolar separator plate 26 is made of a thin layer of titanium 32 having a thickness of 0.005–0.05 cm and electroplated on both sides with layers 34 and 36 of platinum. Layers 34 and 36 have a thickness of 5 to $50 \times 10^{-6}$ cm.

The hydrogen distribution plate 24 has a thickness of 0.075–0.300 cm. and has grooves 30 milled in its surface to a depth of 0.025–0.200 cm.

As noted above, the cell illustrated in FIG. 1 is merely a component part of a stack of cells which form the power source 12 as illustrated in FIG. 2. Consequently, each anode 14 has an adjacent hydrogen distribution plate 24 disposed in contact with it, as illustrated in phantom lines in FIG. 1. When a number of cells have been assembled in a stack, as illustrated in FIG. 2, it becomes necessary to complete the structure with a hydrogen distribution plate 24a and a conductor plate 26a on one side, and a terminal cell 10a which comprises an anode 14b, an electrolyte member 16b, a cathode 18b, an oxygen manifold 22b and a conductor plate 26b. (See FIG. 2.)

During operation of the inventive cell, hydrogen is supplied via hydrogen distribution plate 24 to anode 14. Because anode 14 is made of compacted graphite fibers, it is largely gas permeable and the hydrogen is caused to migrate from the input face 38 of anode 14 to its output face 40. The fibers of anode 14, which are in the region adjacent to output face 40 have a quantity of platinum or other suitable catalyst deposited thereon. Such deposition may be achieved by co-depositing the platinum (as platinum-black particles or supported on conductive carbon particles) with a polymeric material such as "TEFLON" (trademark) a polytetrafluoroethylene polymer, such polymeric material serving as a binder for the platinum (or platinum-containing) particles and as a hydrophobic agent to prevent accumulation of water in the catalyst layer.

Because of the presence of the catalyst platinum, hydrogen molecules reaching the region of anode 14 adjacent face 40 and substantially in contact with the electrolytic layer 16 are decomposed to hydrogen atoms and have their electrons stripped, resulting in the formation of H+ ions. These ions are able to penetrate through the NAFION polymer electrolytic layer of electrolyte member 16. Thus, a continuous flow of hydrogen through the grooves 30 in the hydrogen distribution plate 24 to electrolyte member 16 is achieved.

In similar fashion, oxygen is caused to flow through grooves 28 of the oxygen distribution plate to be brought into contact with cathode 18. Cathode 18, because it is made of compacted carbon or graphite fibers is also permeable to oxygen, resulting in oxygen advancing toward the opposite side of electrolyte member 16 adjacent cathode 18.

Here again, the output face 42 of cathode 18 has its surface impregnated with a deposit of platinum or other suitable catalyst. The result is that the oxygen molecules are broken down into oxygen atoms in the presence of the catalyst and accept electrons from the external circuit while reacting with H+ ions reaching these sites from electrolyte member 16, thereby forming water.

During cell operation, electrons created by the dissociation of the hydrogen molecules and atoms due to the action of the catalyst at the output face 40 of the anode, are available and are sent via an external circuit to a load 44 as illustrated in phantom lines in FIG. 2. Electrons follow the circuit path in the direction indicated by arrow 46. These electrons, after they pass through load 44, become associated with the oxygen atoms created by the platinum at the output face 42 of the cathode 18. This, along with reaction with the H+ ions from electrolyte member 16, results in the formation of water molecules. This ongoing reaction continues to draw hydrogen ions created at the output face 40 of the anode 14 through electrolyte member 16 to the catalyst at cathode output face 42.

The accumulation of product water, as alluded to above, is one of the problems which the inventive cell addresses. Under ideal circumstances, as each molecule of water is formed, due to the association of a pair of hydrogen ions with an oxygen atom and a pair of electrons, it is accepted by the surface of a fiber which makes up the cathode and wicked to the input face 48 of the cathode where it would be exposed to freely flowing air and evaporates, leaving with the effluent air in the system.

In prior art systems, however, the cathode has hydrophobic surface properties. Indeed, the graphite fiber cathode employed in the embodiment of FIG. 1 is naturally hydrophobic. Likewise, the adjacent oxygen distribution plate 22 is also comprised of graphite fibers which are naturally hydrophobic. However, in accordance with the present invention, the molecular characteristics of the porous graphite layer comprising the oxygen distribution plate 22 are altered in order to render it hydrophilic. More particularly, in accordance with the present invention, exposed carbon atoms on the surface of the fibers are oxidized. In accordance with the present invention, radical groups are formed at surface carbon atoms, which radical groups impart hydrophilic characteristics. The result is a graphite oxygen distribution plate which has wicking characteristics which allow it to act as a wick to carry away water molecules while, at the same time, not interfering with the air transport function of its grooves 28.

In accordance with the present invention, the oxygen distribution plate 22 is subjected to a controlled oxidation procedure in order to form certain oxygenated species (such as carboxylic acid groups) on the surface thereof. As noted above, such species tend to render the surface more easily wetted by water. Moreover, provided that the oxidation is carefully controlled, the same can be achieved without affecting the electrical conductivity and strength of oxygen distribution plate 22.

Oxidation can be achieved by exposure of the graphite to air at elevated temperatures in the range of 400° to 600° Centigrade for a period of time in the range of 15 seconds to 15 minutes. The exposure time is limited to be only the amount of time required to achieve a desired degree of oxidation and its corresponding increase in hydrophilicity. If longer exposure periods or higher temperatures are used, oxidation will proceed beyond this point and begin to degrade the mechanical strength and electrical properties of the graphite element.

Another procedure that may be employed to oxidize the surface of the graphite member is to expose it to steam at elevated temperatures in the range of 500°–750° Centigrade. As in the case of exposure to heated air, exposure time should be limited to achieve the desired surface properties without unduly degrading the material. Naturally, in the case of both procedures, exposure times will vary depending upon the temperature of exposure, the dimensions of the graphite member being oxidized, the porosity of the graphite member being oxidized and, perhaps, other individual material factors such as fiber orientation or the like.

It thus becomes necessary to determine the optimum exposure time for a given oxidation procedure and a particular material involved. This optimum time may be achieved by several trial runs with the desired material at different exposure times, followed by measurement of the physical integrity of the material and its hydrophilicity. The physical integrity of the material may be measured by various strength measurements that are in common use (both in compression and in bending); and the electrical integrity may be measured by determining its electronic conductance (both through-plane and in-plane).

The hydrophilicity may be determined simply by observing the rate of dispersion of water droplets introduced onto the surface of the material.

Generally, the approach to obtaining oxidation is to expose the material to steam or hot air for an amount of time sufficient to render the surface hydrophilic and then successively reduce exposure times to the point where the material is no longer sufficiently hydrophilic; i.e., when it is found that water droplets disperse on the surface of the material at an insufficient rate.

Yet another method of achieving the desired hydrophilic surface of the oxygen distribution plate is through a surface-altering procedure employing deposition of carbonaceous materials. Certain liquid hydrocarbons (such as cyclohexane) or alcoholic materials (such as furfural alcohol) can be easily used to form carbonaceous layers on substrate materials. This may be done by impregnation followed by thermal decomposition. Alternatively, certain gaseous hydrocarbons, such as methane and acetylene, can be used to form carbonaceous layers by thermally decomposing them in a high-temperature furnace or by partially combusting them through the use of oxygen in amounts less than that required stoichiometrically for complete combustion. Such deposits are commonly called carbon blacks. The surface characteristics of such blacks are such that they are significantly more hydrophilic than graphite and thus much more easily wetted by water. Accordingly, the graphitic cathode-side gas distribution element can be rendered hydrophilic through deposition of carbon black as described above.

These results would typically be achieved in a high-temperature furnace or in a burner operating in the range of 1,000 degrees Centigrade or higher. Similar results can be obtained at temperatures as low as 800 degrees Centigrade. In accordance with such carbon black deposition techniques, the high-temperature furnace atmosphere in which the same is achieved is the deposition gas itself or the deposition gas diluted in an inert atmosphere such as argon or nitrogen, which atmosphere is introduced through the use of pressurized gas bottles or the like; and the burner atmosphere in which the same is achieved is the deposition gas in the presence of sub-stoichiometric oxygen or air.

Time is a significant factor in such an operation because of the desire to impart certain surface properties to the material while not substantially affecting the morphology of the material.

As can be seen in FIG. 1, all layers of cell 10 are electrically conductive, either electronically or ionically. This includes the anode, the electrolyte, the cathode and the gas-separating metal layer 26 as well as the two graphite gas distribution plates 22 and 24.

Thus, obtaining higher voltages from a cell is merely a matter of stacking cells together in a configuration such as that illustrated in FIG. 2 (series-connected), and using terminal metal layers 26b and 26a in the same manner as battery terminals. In principle, any barrier which allows electronic conduction between gas distribution plates 22 and 24, while still isolating the oxygen and hydrogen gas in the system from each other, can take the place of layer 26.

Figure 3:
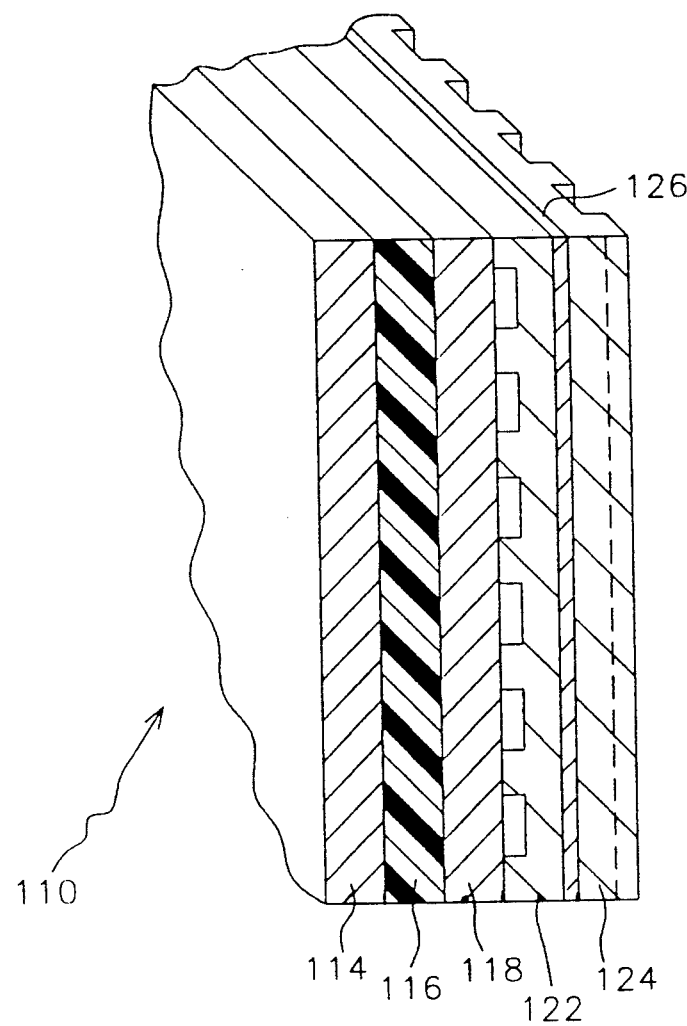
FIG. 3 is an alternative embodiment of a fuel cell constructed in accordance with the invention.

An alternative embodiment which includes just such a member is illustrated in FIG. 3. Generally, similar parts or parts performing analogous, corresponding or identical functions to those of the FIG. 3 embodiment are numbered herein with numbers which differ from those of the earlier embodiment by one hundred.

More particularly, FIG. 3 illustrates a cell 110 which includes an anode 114, an electrolyte layer 116, a cathode 118, an oxygen distribution plate 122 and a hydrogen distribution plate 124 separated by a thin plastic membrane 126. Generally, the operation of the fuel cell illustrated in FIG. 3 is identical to that of FIG. 1 except for membrane 126. Membrane 126 may be made of polysulfone or any suitable ion conductive plastic material. In accordance with the preferred embodiment, polysulfone member 126 has a thickness of about 0.010–0.050 cm. The thicknesses of gas distribution plates 122 and 124 have the same dimensions as in the embodiment of FIG. 1.

Gas distribution plates 122 and 124, together with plastic film 126, form a single member which is electronically conductive in the direction perpendicular to the plane of the member while isolating hydrogen gas on one side of the member from oxygen gas on the other side. This is achieved by stacking the gas distribution plates and the plastic film 126 in the configuration illustrated in FIG. 3 and subjecting the same to pressure between a pair of plates. This results in the carbon fibers in the gas distribution plates merging into the plastic layer and rendering it conductive. At the same time, care must be taken to ensure that the film 126 maintains a tight gas seal between gas distribution plates 122 and 124.

In connection with this, it is noted that the thicknesses of the various elements in the figures are selected for ease of illustration and in some cases are exaggerated, as is clear from the dimensions given in connection with the drawing.

INDUSTRIAL APPLICABILITY

The present invention is particularly suitable for application to modern commercial and military power generation. In particular, this invention can be advantageously applied in fuel cells that provide power for instrumentation and various types of electronic equipment in remote-site and field use. Such fuel cell generators would be characterizable as having a relatively low power output (e.g., less than 1 kW) and a simple, static mode of operation, at or near ambient temperatures and pressures.

It is also possible to achieve hydrophilicity by electro-oxidation of carbon surfaces comprising graphite fiber materials such as KREHA (trademark) KES 400 and TORRAY (trademark) TGP. This is done by submerging the carbon fiber gas distribution plates or flow fields in a container filled with water and placing the container in a bell jar. A moderate vacuum is pulled on the bell jar and the plates are allowed to stand until bubble evolution ceases.

An acid bath of 1N sulfuric acid (not more than a ph of 0.75) is prepared. To process five flow field plates (which are about 2.5 inches by about 3 inches in area and about 0.130 inches thick) at a time, a 3.5 liter bath is used. The flow fields are electrically connected to a wire and submerged in the sulfuric acid bath. The flow fields hang into the bath. A counter electrode is made from a piece of titanium about the same length and width as the flow fields but only about 0.016 inches thick and positioned in facing spaced relationship to the flow field.

The flow field wire and the counter electrode are wired to a power supply of about five volts. The counter electrode is connected to the negative terminal and the flow field wire is connected to the positive terminal.

A current of about 2–3 amps is thus caused to flow for about 10 minutes. The bubble generation is indicative of the oxidation rate. The flow fields are then rinsed in water several times and baked dry at about 110° Centigrade for an hour.

The bath has been used for treating about twenty electrodes (4 batches). If used for too long, the bath turns brown and particles of carbon can be found on the bottom.

While an illustrative embodiment of the invention has been described above, it is, of course, understood that various modifications will be apparent to those of ordinary skill in the art. Such modifications are within the spirit and scope of the invention, which is limited and defined only by the appended claims.

I claim:

1. An ion-exchange membrane electrolyte, water-producing, fuel cell for electricity generation by catalytic combustion of a gaseous hydrogenous fuel with gaseous oxygen leading to formation of water at the cathode, said fuel cell comprising:
   a) an anode;
   b) means to supply a gaseous hydrogenous fuel to said anode;
   c) an oxygen-gas-pervious cathode;
   d) an electrolyte disposed between said anode and said cathode; and
   e) a water-pervious, electrically conductive, graphitic, oxygen-distribution member positioned adjacent said cathode to supply oxygen thereto and remove water therefrom, and having oxygen-distribution passages communicating with said cathode for the supply of oxygen thereto;

wherein said graphitic oxygen-distribution member is composed of a graphite material chemically activated to be hydrophilic, mechanically strong and electrically conductive, whereby water formed at said cathode is transported through said graphitic oxygen-distribution member with said oxygen-distribution passages remaining open for the distribution of oxygen to said cathode.

2. A fuel cell according to claim 1 wherein said oxygen-distribution member has a high hydrophilicity compared with untreated graphitic material, said hydrophilicity determined by observed rates of dispersion of water droplets introduced onto a surface of said graphitic material before and after chemical activation.

3. A fuel cell according to claim 1 wherein said oxygen-distribution member is composed of a fibrous graphite material surface-treated to have oxygenated species chemically bound to said fibrous graphite material.

4. A fuel cell according to claim 3 wherein said hydrophilic moieties include polar moieties being the product of oxidation of said fibrous graphite material.

5. A fuel cell according to claim 1 wherein said oxygen-distribution member is composed of a fibrous graphite material surface-treated to have carbon black material bound to said graphite material.

6. A fuel cell according to claim 1 wherein said anode, said cathode and said oxygen-distribution member constitute plates and are arranged in a stack.

7. A fuel cell according to claim 6 wherein said oxygen-distribution plate has a cathode-engaging face pressed into firm engagement with said cathode and said oxygen-distribution passages comprise grooves on said cathode-engaging face of said oxygen-distribution plate, said grooves defining ridges in said oxygen-distribution member, product water transported through said ridges away from said cathode.

8. A fuel cell assembly comprising a plurality of fuel cells according to claim 6, arranged face-to-face, in an extended stack and further comprising an electrically conductive separator plate between adjacent fuel cells in said extended stack.

9. A fuel cell according to claim 1 further comprising, for series-connection into a fuel cell assembly, a conductive separator secured to said oxygen-distribution member and a conductive hydrogenous-fuel distribution member secured to said conductive separator.

10. A fuel cell according to claim 1 wherein said anode comprises a graphitic member and said electrolyte comprises a proton-exchange membrane.

11. An ion-exchange member electrolyte, water-producing, fuel cell for electricity generation by catalytic combustion of a gaseous hydrogenous fuel with gaseous oxygen leading to formation of water at the cathode, said fuel cell comprising:
  a) an anode;
  b) means to supply a gaseous hydrogenous fuel to said anode;
  c) an oxygen-gas-pervious cathode;
  d) an electrolyte disposed between said anode and said cathode; and
  e) a water-pervious, electrically conductive, graphitic, oxygen-distribution member positioned adjacent said cathode to supply oxygen thereto and remove water therefrom, and having oxygen-distribution passages communicating with said cathode for the supply of oxygen thereto;

wherein said graphitic oxygen-distribution member is composed of a fibrous graphite material surface treated to be hydrophilic, mechanically strong and electrically conductive, by having oxygenated species chemically bound to said fibrous graphite material and said oxygen-distribution member has a cathode-engaging face pressed into firm engagement with said cathode and said oxygen-distribution passages comprise grooves on said cathode-engaging face of said oxygen-distribution member, said grooves defining ridges in said oxygen-distribution member, product water transported through said ridges away from said cathode.

* * * * *